US006581380B2

(12) United States Patent
Dangel et al.

(10) Patent No.: US 6,581,380 B2
(45) Date of Patent: Jun. 24, 2003

(54) MASTER CYLINDER WITH IMPROVED PISTON GUIDANCE

(75) Inventors: Tim M. Dangel, Oxford, MI (US); Paul L. Barr, Clarkston, MI (US)

(73) Assignee: Automotive Products (USA), Inc., Auburn Hills, MI (US)

(*) Notice: Subject to any disclaimer, the term of this patent is extended or adjusted under 35 U.S.C. 154(b) by 0 days.

(21) Appl. No.: 09/906,287

(22) Filed: Jul. 16, 2001

(65) Prior Publication Data

US 2003/0010027 A1 Jan. 16, 2003

(51) Int. Cl.[7] ............................................. B60T 11/26
(52) U.S. Cl. .................................... 60/588; 60/591
(58) Field of Search ........................... 60/588, 591, 562

(56) References Cited

U.S. PATENT DOCUMENTS

| 4,565,066 A | * | 1/1986 | ITT Industries, Inc. et al. ................ 60/533 |
| 4,590,765 A | | 5/1986 | Leigh-Monstevens ........ 60/588 |
| 4,872,396 A | | 10/1989 | Wimbush |
| 4,941,323 A | | 7/1990 | Leigh-Monstevens |
| 4,989,498 A | | 2/1991 | Mori et al. ..................... 92/168 |
| 6,336,329 B1 | * | 1/2002 | Adler et al. ................... 60/588 |
| 6,408,623 B1 | * | 6/2002 | Mollier et al. ................. 60/588 |
| 6,422,130 B1 | | 7/2002 | Angione ....................... 92/187 |

FOREIGN PATENT DOCUMENTS

| FR | 2 757 234 A1 | 12/1996 |
| GB | 1065599 | 4/1967 |
| GB | 2017240 | 10/1979 |
| GB | 2295428 | 11/1995 |
| WO | WO97/01469 | 1/1997 |

* cited by examiner

Primary Examiner—Edward K. Look
Assistant Examiner—Thomas E. Lazo
(74) Attorney, Agent, or Firm—Young & Basile P.C.

(57) ABSTRACT

A master cylinder formed of a forward plastic part snapingly secured to a rearward plastic part. The forward part has a tapered draft angle bore and the rearward part has a purely cylindrical bore aligned with the draft angle bore of the front part and conforming to the diameter of the piston of the cylinder. An annular groove is defined by the parts in surrounding relation to the aligned bores and an annular bearing, having a true cylindrical inner surface corresponding to the diameter of the piston, is positioned in the groove to guide the front end of the piston as the piston moves forwardly into the tapered bore of the forward part.

19 Claims, 4 Drawing Sheets

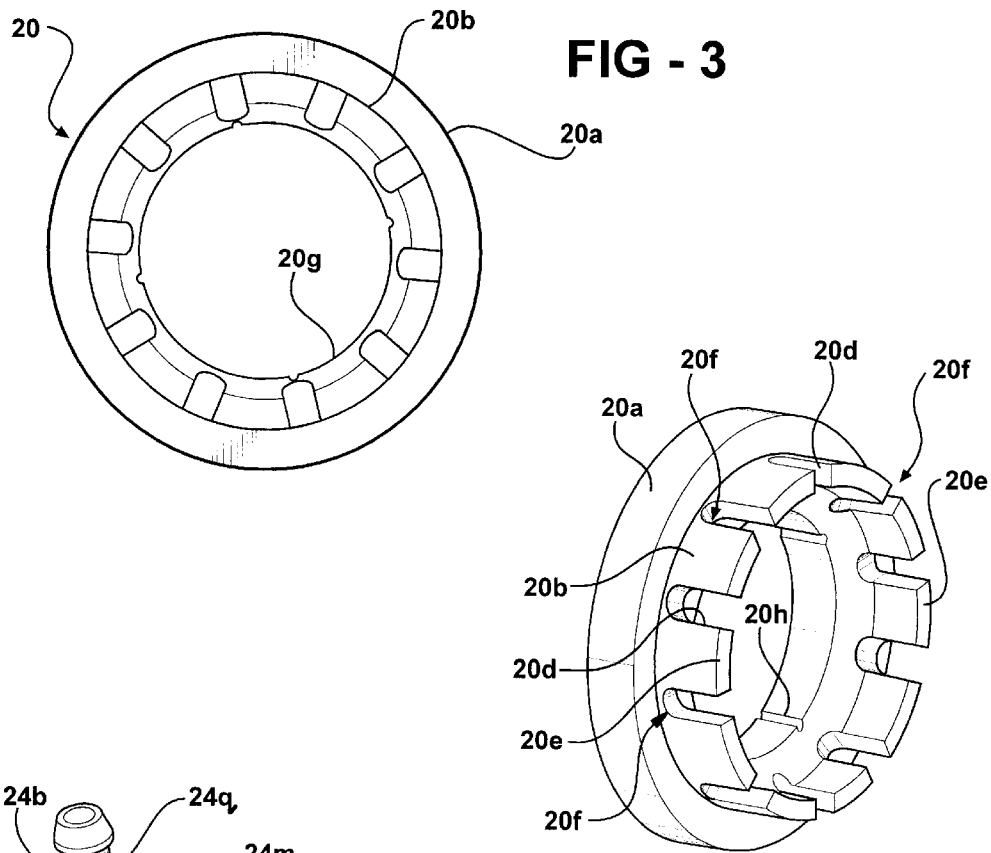
FIG - 3
FIG - 4
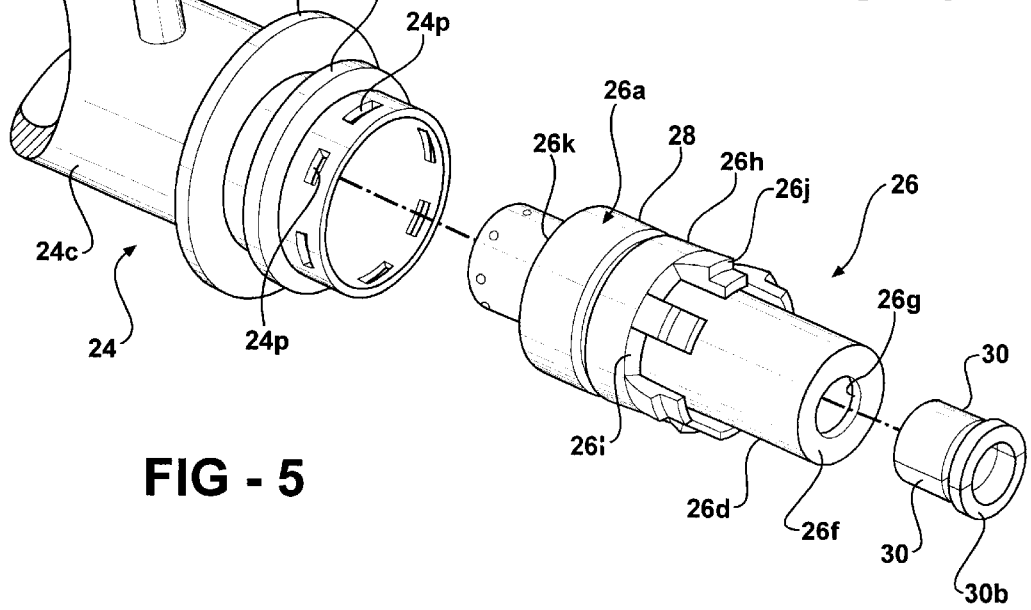
FIG - 5

MASTER CYLINDER WITH IMPROVED PISTON GUIDANCE

FIELD OF THE INVENTION

This invention relates to master cylinders and more particularly to master cylinders especially suited for use in a master/slave hydraulic control system.

Master cylinders are in common usage such, for example, as in combination with a slave cylinder to provide the actuating mechanism for a mechanical clutch of a motor vehicle.

A typical master cylinder assembly includes a casing structure defining a cylindrical bore and a piston slidably mounted in the bore. Pressurized hydraulic fluid is discharged from the cylindrical bore for delivery to the slave cylinder in response to stroking reciprocal movement of the piston in the bore. Master cylinder assemblies were originally formed primarily of metallic materials but more recently the cylinder bodies have been formed of a plastic material to facilitate the manufacturing process and reduce the cost of the assembly.

Forming the cylindrical body of a plastic material has the disadvantage that either the bore must be tapered to provide a certain amount of draft to facilitate unmolding, or complicated and expensive molding procedures must be employed to provide a purely cylindrical bore. The use of expensive molding procedures of course significantly increases the cost of the overall assembly and the use of less costly molding procedures to produce a draft angle bore results in a bore that is not purely cylindrical with resultant piston binding and wear problems. Attempts have also been made to restore a purely cylindrical surface to a tapered bore utilizing a metallic sleeve made of steel, aluminum, or other metal or metal alloy and positioned within the tapered bore of the plastic cylinder body. However, this construction again adds complexity and expense to the cylinder assembly.

SUMMARY OF THE INVENTION

This invention is directed to the provision of a master cylinder assembly providing improved piston guidance.

More specifically, this invention is directed to a provision of a master cylinder assembly that is inexpensive to produce and yet provides excellent piston guidance.

The invention relates to a master cylinder of the type comprising a casing structure defining a bore and a piston mounted for sliding stroking movement in the bore between rearwardly retracted and forwardly extended positions and adapted for connection at a rearward end thereof to a piston rod. The casing structure further defines an annular groove in surrounding relation to the bore between the ends of the bore and further defines a reservoir port opening in the groove and communicating with a reservoir for holding hydraulic fluid.

According to the invention, the casing comprises a molded plastic structure; the bore includes a forward portion forwardly of the annular groove having a draft angle with the bore diameter forwardly decreasing; and the master cylinder further includes an annular bearing position at the forward end of the annular groove and having an internal cylindrical bearing surface for receiving and guiding the piston having a diameter approximating the diameter of the piston and greater than the diameter of the forward portion of the bore at the juncture of the forward bore portion with the forward end of the annular groove.

This arrangement allows inexpensive molding techniques to be utilized with respect to the forward portion of the bore while yet providing excellent bearing guidance for the piston.

According to a further feature of the invention, the bore further includes a rearward portion rearwardly of the annular groove defining a purely cylindrical bearing surface slidably receiving a rearward end of the piston. This arrangement allows expensive molding techniques to be utilized in association with the rearward end of the bore to produce a purely cylindrical bearing surface for coaction with the bearing member while continuing to allow inexpensive molding techniques to be utilized in association with the forward portion of the bore.

According to a further feature of the invention, the casing structure comprises two separate, molded plastic parts including a front part defining the forward draft angle bore portion and a rear port defining the cylindrical rearward bore portion. This arrangement clearly distinguishes between the relatively inexpensive technology required to produce the draft angle forward bore portion and the relatively expensive technology required to produce the cylindrical rearward bore portion.

According to a further feature of the invention, the master cylinder further includes an annular seal positioned in the annular groove forwardly of the port and rearwardly of the bearing member; the bearing member includes a main body annular portion seated against an annular shoulder defining the forward end of the annular groove and an annular lip portion extending rearwardly from the main body forward portion and having a crenellated configuration; and the seal includes a flexible annular lip portion positioned in annular surrounding relation to the bearing lip and movable in response to fluid pressure variations between an outwardly flexed position in which it blocks communication between the reservoir and the forward bore portion and an inwardly flexed position in which it allows communication between the reservoir and the forward bore portion through the bearing member lip crenelation. This arrangement allows the bearing member to further function as a routing device to allow recuperative fluid to flow into the forward portion of the bore behind the retreating piston.

According to a further feature of the invention, a plurality of circumferentially spaced axially extending and radially inwardly opening grooves are provided in the forward bore portion; and a plurality of circumferentially spaced axially extending and radially inwardly opening grooves are provided in the annular bearing face of the bearing member for coaction with the bore grooves, the bearing lip crenelation, and the seal lip. This arrangement allows communication between the forward bore portion and the reservoir even with the piston in the forwardly extended position received within the bearing member whereby fluid may readily flow from the reservoir to a location in the forward bore portion forwardly of the piston as the piston moves from a forwardly extended position to a rearwardly retracted position.

According to a further feature of the invention, the annular seal comprises a primary seal; and the master cylinder further includes a secondary annular seal positioned in the annular groove rearwardly of the reservoir port. This arrangement allows the use of primary and secondary seals to minimize leakage in the master cylinder assembly.

According to a further feature of the invention, the master cylinder further includes an annular spacer positioned in the annular groove between the primary seal and the secondary seal proximate the reservoir port and including passage means allowing the passage of fluid forwardly from the reservoir port to the primary seal. This arrangement allows the spacer to function to maintain proper spacing between the primary and secondary seals while yet allowing the flow of fluid forwardly from the reservoir port to the primary seal where it may flow through the crenelation of the bearing member and into the forward bore portion.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a detail view of a bearing member utilized in the invention master cylinder;

FIG. 4 is a perspective view of the bearing member;

FIG. 5 is an exploded view of a casing structure utilized in the invention master cylinder;

DESCRIPTION OF THE PREFERRED EMBODIMENT

Figure 1:
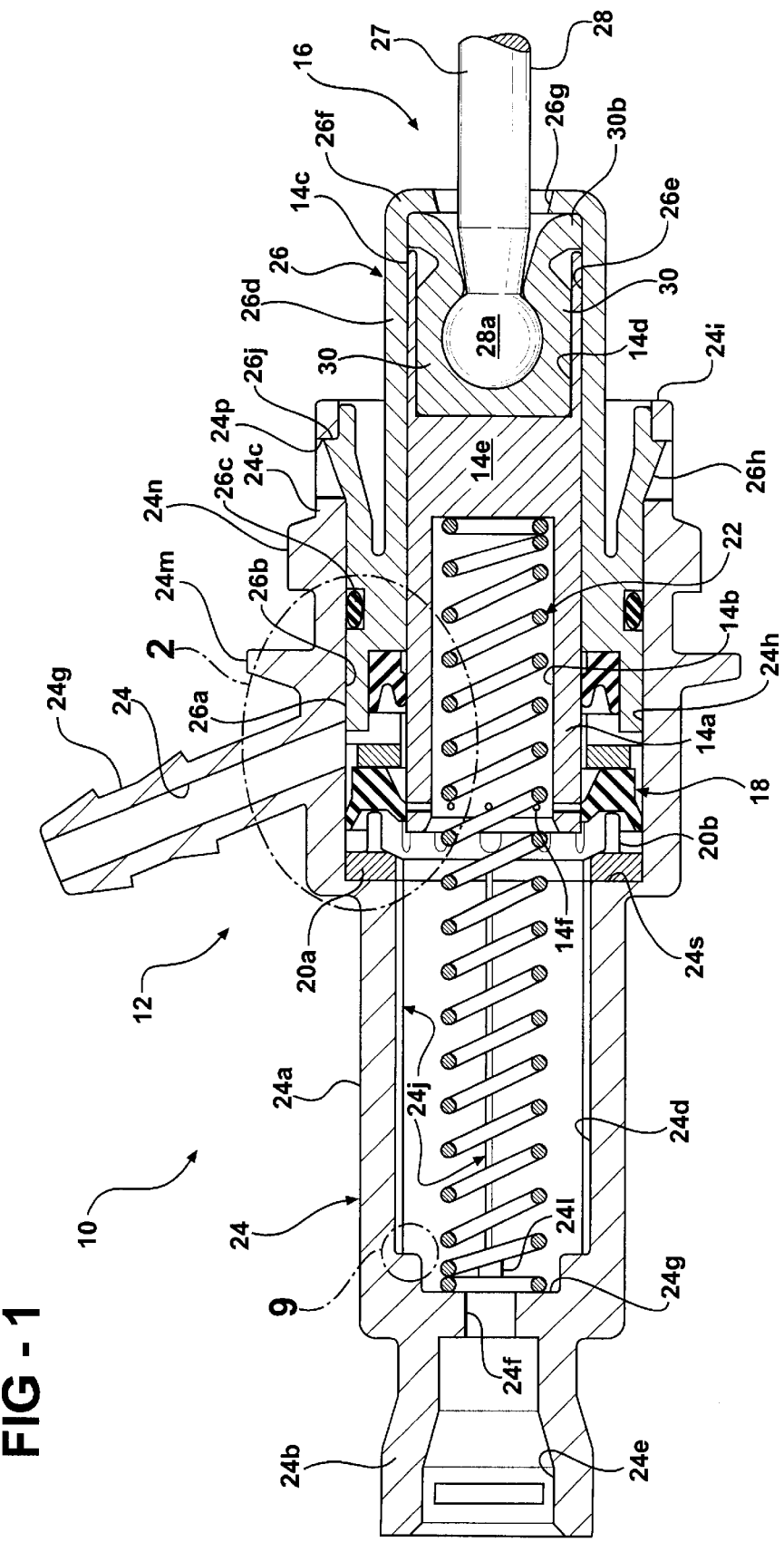
FIG. 1 is a cross sectional view of a master cylinder according to the invention.

The master cylinder 10 of the invention may be utilized in a master/slave cylinder hydraulic system where it is desired to deliver pressurized fluid from a master cylinder in response to operator input via a piston rod for delivery to a slave cylinder which functions to perform a work operation. The master cylinder of the invention may be used for example in a motor vehicle clutch system wherein a clutch pedal of the vehicle is utilized to actuate the master cylinder to deliver pressurized fluid to a slave cylinder to engage and disengage the clutch.

Master cylinder 10 (FIG. 1), broadly considered, includes a casing structure 12, a piston 14, a piston rod assembly 16, a seal assembly 18, a bearing member 20, and a spring 22.

Figure 2:
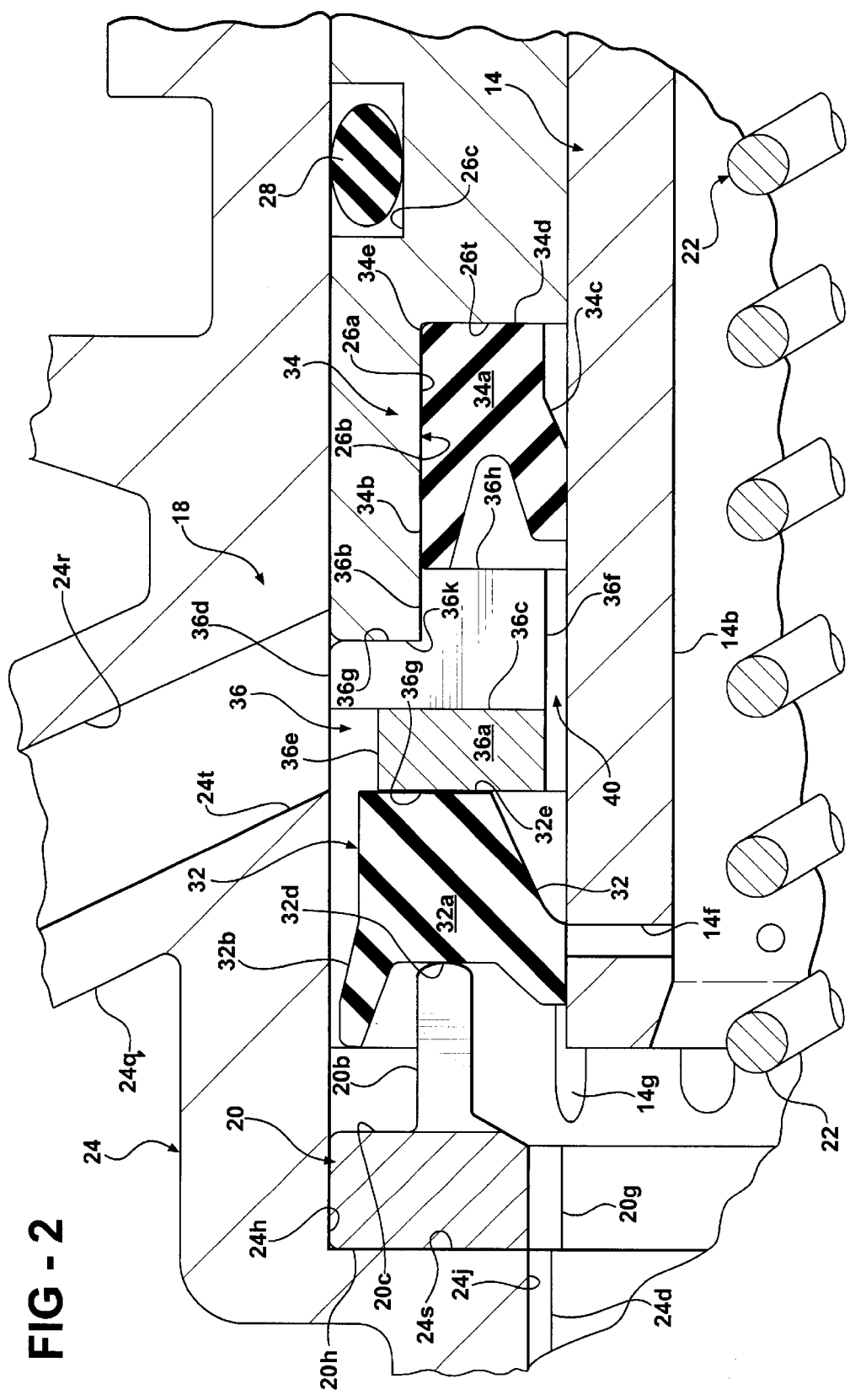
FIG. 2 is a detail view taken within the circle 2 of FIG. 1.
Figure 9:
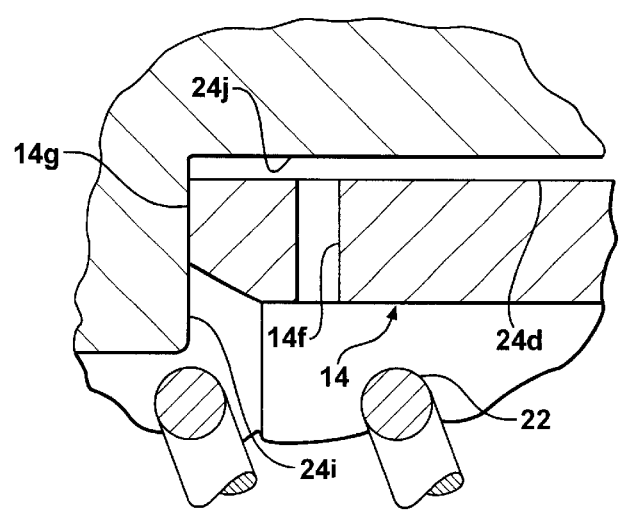
FIG. 9 is a detail view taken within the circle 9 of FIG. 1.

Casing structure 12 includes a body 24 and a piston retainer 26 both formed in a suitable molding operation of a suitable plastic material such for example as polytetrofluoro ethylene or glass reinforced nylon. Body 24 has a generally tubular configuration and includes a main body portion 24a, a forward fitting portion 24b, and an enlarged rear portion 24c. Main body portion 24a defines a central bore 24d, fitting portion 24b defines a central bore 24e communicating with bore 24d via a port 24f extending through a forward end wall 24g, and rear portion 24c defines a bore 24h opening at the rearward annular end 24i of the rear portion. Bore 24d is tapered (see also FIGS. 2 and 9) with a draft angle of, for example, one half to one degree resulting from standard molding operations requiring uncoupling of the mold following the molding operation, and a plurality of axially extending circumferentially spaced radially inwardly opening grooves 24j are provided in bore 24d. Grooves 24j preferably extend parallel to the center line 27 of the casing. The grooves therefore have an angled disposition relative to the tapered bore 24d and increase gradually in depth moving forwardly within the bore 24d to a maximum depth where the grooves juncture with a respective plurality of circumferentially spaced ribs 24l proximate the forward end of bore 24d. The minimal diameter of bore 24d, occurring at the juncture of the bore with ribs 24l, corresponds generally to the diameter of piston 14.

Body 24 (FIGS. 1, 2 and 5) further includes annular external mounting flanges 24m and 24n to facilitate mounting of the casing to the associated motor vehicle structure, a plurality of circumferentially spaced rectangular openings 24p positioned in rear portion 24c proximate annular rear end 24i, and a spigot or fitting 24q defining an angled central reservoir bore 24r opening at port 24t in bore 24h and arranged for communication with a suitable reservoir (not shown) for containing hydraulic fluid.

Piston retainer 26 (FIGS. 1, 2 and 5) has a generally tubular configuration and includes a forward portion 26a defining an internal forwardly opening groove 26b and an external groove 26c receiving an "O" ring 28, a rear main body portion 26d defining a cylindrical bore 26e and including a rear wall 26f defining a central opening 26g; and a plurality of circumferentially spaced spring fingers or prongs 26h extending rearwardly from an annular shoulder 26i interconnecting portions 26a and 26d.

Piston 14 (FIGS. 1 and 2) may be formed of a suitable plastic, aluminum, or other metallic material and includes a forward portion 14a defining a blind forwardly opening central bore 14b and a rearward portion 14c defining a rearwardly opening blind central bore 14d. A partition 14e separates bores 14b and 14d and a plurality of circumferentially spaced generally circular apertures 14f extend through the tubular wall of forward portion 14a proximate the forward annular end 14g of the piston. The outer periphery of piston 14 has a purely cylindrical geometry conforming to the geometry of cylindrical bore 26e.

Piston rod assembly 16 (FIGS. 1 and 5) includes a piston rod 28 and piston rod retainers 30. Piston rod 28 is of known form and is intended for coaction at its rearward end, for example, with a clutch pedal of a motor vehicle. The forward end of the piston rod has a ball configuration 28a. Retainers 30 are designed to coact to encapsulate the ball 28a of the piston rod and have a cylindrical configuration sized to fit within blind bore 14d with the ball 28a of the piston rod entrapped therebetween.

Seal assembly 18 (FIGS. 1 and 2) includes a primary seal 32, a secondary seal 34, and a spacer 36.

Primary seal 32 is formed of a suitable elastomeric material such for example as EPDM and has an annular configuration. Seal 32 includes an annular main body portion 32a, an outer lip portion 32b, and an inner lip portion 32c. Outer lip portion 32b has a thinner cross sectional configuration than inner lip portion 32c so as to be more readily flexed.

Secondary seal 34 is also formed of a suitable elastomeric material such for example as EPDM and has an annular configuration. Secondary seal 34 includes a main body portion 34a, and outer lip portion 34b, and an inner lip portion 34c.

Figure 6:
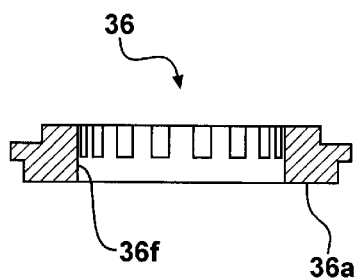
FIGS. 6, 7 and 8 are detail views of a spacer utilized in the invention master cylinder.
Figure 7:
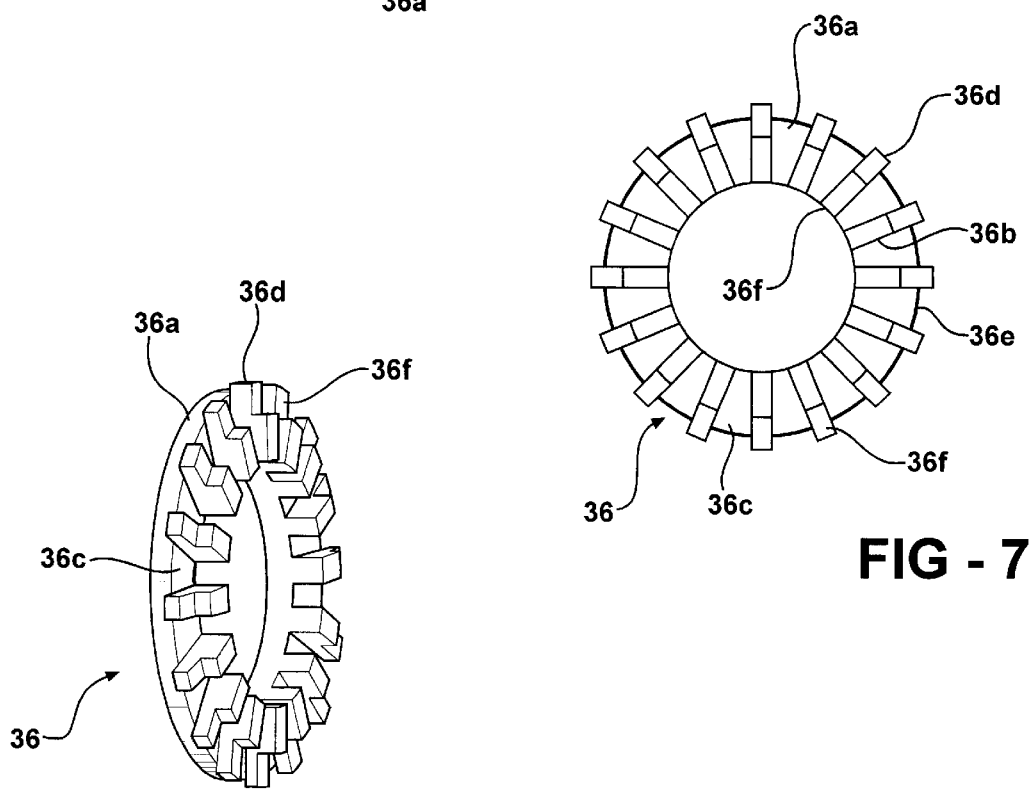
Figure 8:
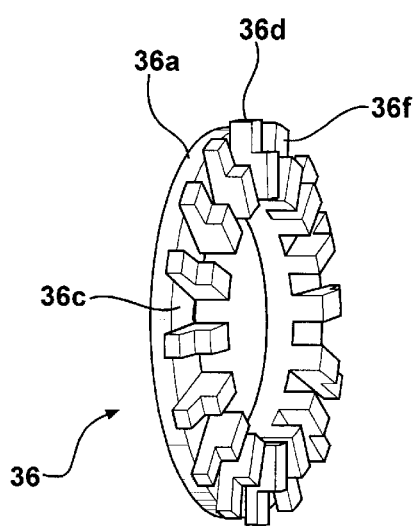

Spacer 36 (see also FIGS. 6, 7 and 8) has an annular configuration and is formed of a suitable plastic material in a suitable molding operation. Spacer 36 includes an annular main body portion 36a and a plurality of circumferentially spaced lug portions 36b projecting rearwardly from a rear face 36c of the main body portion and each including a crenel portion 36d projecting radially outwardly beyond the outer periphery 36e of the main body portion to provide a castellated or crenellated configuration to the outer periphery of the spacer. The outer diameter of the spacer as defined by the radially outwardly projecting crenel portions 36b corresponds generally to the diameter of bore 24h of the rear portion of the body of the casing structure and the inner diameter 36f of the spacer is larger than the diameter of piston 14 so as to define an annular passage 40 therebetween.

Bearing 20 (FIGS. 1–4) has an annular configuration and is formed of a suitable plastic material such for example as a pure nylon material. Bearing 20 includes an annular main body portion 20a and an annular lip portion 20b extending rearwardly from a rear face 20c of the bearing and including a plurality of circumferentially spaced cutouts 20d giving the lip a crenellated or castellated configuration including circumferentially spaced land portions 20e alternating with grooves or passages 20f. The outer diameter of the main body portion 20a of the bearing is slightly in excess of the diameter of the bore 24h and the inner diametric surface 20g of the bearing has a purely cylindrical geometry corresponding to the outer diameter of piston 14 and the diameter of bore 26e and slightly exceeding the diameter of bore 24d at the juncture of bore 24d with an annular shoulder 24s interconnecting bores 24d and 24h. A plurality of circumferentially spaced axial grooves 20h are provided on the inner diameter of the bearing. Grooves 20h preferably correspond in number and circumferential spacing to the grooves 24j in bore 24d.

Spring 22 (FIGS. 1, 2 and 9) is formed of a suitable metallic and has a known coil configuration.

Assembly

In the assembled configuration of the master cylinder (FIGS. 1 and 2), piston retainer 26 is telescopically received in bore 24h and is locked in position within the body by the engagement of shoulders 26j defined on fingers 26h against the rearward edges of openings 24p; piston 14 is slidably received in bore 26e; piston rod retainers 30 are positioned in blind bore 14d; piston rod 28 extends through opening 26g with its spherical forward end 28a encapsulated by retainers 30; bearing 20 is received with a press fit in the forward end of bore 24h with the forward face 20h of main body portion 20a seated against annular shoulder 24s and with grooves 20e in respective circumferential alignment with grooves 24j; primary seal 32 is positioned in bore 24h against bearing 20 with outer lip 32b flexibly and sealably engaging bore 24h, inner lip 32c flexibly and sealingly engaging the outer periphery of piston 14, and a crotch 32d defined between inner and outer lips 32b and 32c seated against the land portions 20e of the bearing lip; spacer 36 is positioned in bore 24h against primary seal 32 with the forward annular face 36g of main body portion 36a seated against rear annular face 32e of the main body portion 32a of primary seal 32, the outer diameter of crenels 36b seated in bore 24h and in radial alignment with reservoir passage 24r, inner diameter 36f positioned in outwardly spaced relation to the outer diameter of piston 14 to define annular passage 40 between the piston and the spacer, and the rearward face 36g of crenels 36d seated against the annular forward edge 26k of piston retainer 26; secondary seal 34 is positioned in groove 26b with the rear annular face 34d of the main body of the seal seated against an annular shoulder 26t defining the rearward extent of groove 26b, the outer face 34e of the main body of the seal positioned against surface 26u defining the outer periphery of groove 26b, outer lip 34b flexibly and sealably positioned in the juncture between the rearward face 36h of the spacer lugs 36b and the surface 26u, and inner lip 34c flexibly and sealingly engaging the outer periphery of piston 14; and spring 22 is positioned at its rearward end in blind bore 14b and at its forward end against end wall 24g to resiliently maintain the piston in a rearwardly retracted position within bore 26e wherein the annular rear surface 30b of retainers 30 engage wall 26f and apertures 14f are positioned immediately rearwardly of the sealing line on the piston of inner lip 32c of the primary seal.

It will be seen that body 24 and piston retainer 26 coact to define a casing structure having a central bore defined by bores 24d/26e, that surfaces 24s, 24h, 26k, 26u and 26t combine in the assembled master cylinder to define an annular groove positioned in surrounding relation to the bore 24d/26e between the ends of the bore in which the primary seal, spacer, and secondary seal are positioned in surrounding relation to the piston, and that the rear end of tapered bore 24d, where it intersects shoulder 24s, has a slightly greater diameter than the cylindrical bearing surface 20g defined by the inner diameter of bearing 20.

Operation

With the piston in the fully retracted position seen in FIG. 1, it will be seen that the reservoir and the bore of the casing are connected by bore 24r, spaces between the crenels of the spacer lugs, passage 40, and apertures 14f so that the reservoir and casing structure may equalize to ensure that the bore of the casing is filled at all times. The described fluid passage between the reservoir and the bore of the cylinder also facilitates initial filling of the cylinder.

When the piston is moved forwardly in the cylinder in response to, for example, depression of the clutch pedal of the associated motor vehicle, apertures 14 immediately move beyond the effective sealing edge of the inner lip 32c of the primary seal so that communication between the reservoir and the bore of the cylinder is terminated and so that, as the piston continues to move forwardly, the fluid forwardly of the piston is pressurized for delivery to the slave cylinder and ultimate actuation of the associated clutch of the motor vehicle.

The forward movement of the piston is resisted by compression of the spring 22 and the forward or extended position of the piston is defined by engagement of the annular front edge 14g of the piston with ribs 24l. As the piston moves forwardly from its retracted to its extended position, it is initially guided by cylindrical bore 26e and thereafter, with continued forward movement, is further guided by the inner cylindrical surface 20g of bearing 20. In this regard, whereas bore 26e may be molded with a draft to facilitate unplugging of the mold, preferably sophisticated molding procedures are employed to ensure that the bore 26e has a truly cylindrical configuration to optimize the guiding action provided to the piston. The draft angles and other dimensions of body 24 are preferably chosen such that as the piston arrives at its extreme forward position, the diameter of the piston essentially matches the diameter of the bore 24d.

In a normal retraction of the piston wherein the operator's foot remains on the clutch pedal and allows the system to gradually return to a retracted position, fluid from the slave cylinder and the interconnecting conduit flow into the bore 24d behind the retreating piston to ensure that the bore remains filled.

However, in certain situations such as when the operators foot slips off the clutch pedal and the pedal and the piston are returned abruptly to the retracted position, the fluid from the slave cylinder and conduit are unable to in effect keep up with the retreating piston to fill the bore behind the retreating piston. In this case, it is necessary to allow the reservoir to replenish or recoup the cylinder. This recouping flow is allowed by radially inward flexing movement of the outer lip of the primary seal to the dash line position seen in FIG. 2 so as to create a passage from port 24r around the outer periphery of the primary seal, around the inwardly flexed lip 32b, through the crenelations of the bearing, through the axial bearing grooves 20h, and through the axial bore grooves 24j.

Whereas it is desirable that the bearing grooves 20h line up circumferentially with the respective bore grooves 24j, such alignment is not critical since the difference in diameter between the bearing cylindrical surface 20g and the body bore proximate the bearing allows fluid to circulate circumferentially between the bearing grooves and the bore grooves to seek out the bore grooves even if they are not axially aligned with the respective bearing grooves.

The use of a separate bearing member defining a true cylindrical bearing surface for engagement with the piston will be seen to allow the use of conventional inexpensive molding techniques with respect to the body of the casing structure without derogating the bearing support provided to the piston, thereby resulting in a significant savings in the overall cost of the master cylinder assembly.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A master cylinder comprising:
   a casing structure defining a bore, an annular groove in surrounding relation to the bore between forward and rearward ends of the bore, and a reservoir port opening in the groove and communicating with a reservoir for containing hydraulic fluid, the bore including a forward portion forwardly of the annular groove having a draft angle with the bore diameter forwardly decreasing;
   a piston mounted for sliding stroking movement in the bore between rearwardly retracted and forwardly extended positions and adapted for connection at a rearward end thereof to a piston rod;
   an annular seal positioned in the annular groove forwardly of the reservoir port; and
   an annular bearing member positioned in the annular groove forwardly of the seal and having an internal cylindrical bearing surface for guiding a forward end of the piston dining stroking movement of the piston in the bore.

2. A master cylinder according to claim 1 wherein:
   the annular seal comprises a primary seal; and
   the master cylinder further includes a secondary annular seal positioned in the annular groove rearwardly of the reservoir port.

3. A master cylinder according to claim 2 wherein the master cylinder further includes an annular spacer positioned in the annular groove between the primary seal and the secondary seal proximate the reservoir port; and
   the spacer provides passage means allowing the passage of fluid therethrough from the reservoir port.

4. A master cylinder comprising:
   a casing structure defining a bore, an annular groove in surrounding relation to the bore between forward and rearward ends of the bore, and a reservoir port opening in the groove and communicating with a reservoir for containing hydraulic fluid;
   a piston mounted for sliding stroking movement in the bore between rearwardly retracted and forwardly extended positions and adapted for connection at a rearward end thereof to a piston rod;
   an annular seal positioned in the annular groove forwardly of the reservoir port;
   an annular bearing member positioned in the annular groove forwardly of the seal for guiding a forward end of the piston during stroking movement of the piston in the bore;
   the bearing member including a main body annular portion seated against an annular shoulder defining the forward end of the annular groove and an annular lip portion extending rearwardly from the main body portion and having a crenellated configuration; and
   the seal including a flexible annular lip portion positioned in annular surrounding relation to the bearing lip and movable in response to fluid pressure variations between an outwardly flexed position in which it blocks communication between the reservoir and the bore and an inwardly flexed position in which it allows communication between the reservoir and the bore through the bearing lip crenelation.

5. A master cylinder according to claim 4 wherein:
   a plurality of circumferentially spaced, axially extending, and radially inwardly opening grooves are provided in the bore forwardly of the bearing;
   a plurality of circumferentially spaced, axially extending, and radially inwardly opening grooves are provided in the annular bearing face of the bearing for coaction with the bore grooves, the bearing lip crenelation, and the seal lip to allow communication between the bore and the reservoir even with the piston in a forwardly extended position received within the bearing whereby fluid may readily flow from the reservoir to a location in the bore forwardly of the piston as the piston moves from a forwardly extended position to a rearwardly refracted position.

6. A master cylinder comprising a casing structure defining a bore, an annular groove in surrounding relation to the bore between forward and rearward ends of the bore, and a reservoir port opening in the groove and communicating with a reservoir for containing hydraulic fluid; and a piston mounted for sliding, stroking movement in the bore between rearwardly retracted and forwardly extended positions and adapted for connection at a rearward end thereof to a piston rod, characterized in that:
   the casing structure comprises a molded plastic structure;
   the bore includes a forward portion forwardly of the annular groove having a draft angle with the bore diameter forwardly decreasing; and
   the master cylinder further includes an annular bearing member positioned at the forward end of the annular groove and having an internal cylindrical bearing surface for receiving and guiding the piston having a diameter approximating the diameter of the piston and greater than the diameter of the forward portion of the bore at the juncture of the forward bore portion with the forward end of the annular groove.

7. A master cylinder according to claim 6 wherein the bore further includes a rearward portion rearwardly of the annular groove defining a purely cylindrical bearing surface slidingly receiving a rearward end of the piston.

8. A master cylinder according to claim 7 wherein the casing structure comprises two separate, molded plastic parts including a front part defining the forward draft angle bore portion and a rear part defining the cylindrical rearward bore portion.

9. A master cylinder according to claim 6 wherein:
the master cylinder further includes an annular seal positioned in the annular groove forwardly of the reservoir port and rearwardly of the bearing member;
the bearing member includes a main body annular portion seated against an annular shoulder defining the forward end of the annular groove and an annular lip portion extending rearwardly from the main body portion and having a crenellated configuration; and
the seal includes a flexible annular lip portion positioned in annular surrounding relation to the bearing lip portion and movable in response to fluid pressure variations between an outwardly flexed position in which it blocks communication between the reservoir and the bore and an inwardly flexed position in which it allows communication between the reservoir and the bore through the bearing lip crenelation.

10. A master cylinder according to claim 9 wherein:
a plurality of circumferentially spaced axially extending and radially inwardly opening grooves are provided in the bore forwardly of the bearing; and
a plurality of circumferentially spaced, axially extending and radially inwardly opening grooves are provided in the cylindrical bearing surface of the bearing member for coaction with the bore grooves, the bearing lip crenelation, and the seal lip to allow communication between the bore and the reservoir even with the piston in a forwardly extended piston received within the bearing member whereby fluid may readily flow from the reservoir to a location in the bore forwardly of the piston as the piston moves from a forwardly extended position to a rearwardly retracted position.

11. A master cylinder according to claim 10 wherein:
the annular seal comprises a primary seal; and
the master cylinder further includes a secondary annular seal positioned in the annular groove rearwardly of the reservoir port.

12. A master cylinder according to claim 11 wherein:
the master cylinder further includes an annular spacer positioned in the annular groove between the primary seal and the secondary seal proximate the reservoir port; and
the spacer provides passage means allowing the passage of fluid therethrough from the reservoir port.

13. A master cylinder assembly including a molded front part defining a forward bore, a molded rear part defining a rear bore, coacting means on the front and rear parts fixedly coupling the parts together with the forward bore and the rearward bore aligned, and a piston mounted for reciprocal stroking movement in the aligned bores between retracted and extended positions, characterized in that:
the front part is molded with an annular groove positioned radially outwardly of the forward bore;
the forward bore extends forwardly from the groove to a location proximate a front end of the front part and is molded with a draft angle with the diameter maximized at the groove and decreasing in a forward direction; and
the master cylinder assembly further includes an annular bearing seated in the groove and having a cylindrical inner diameter conforming generally to the diameter of the piston and greater than the diameter of the forward bore portion at the groove whereby to provide bearing support for a front end of the piston as the front end of the piston moves forwardly into the draft angle forward bore.

14. A master cylinder assembly according to claim 13 wherein the rear part is molded to impart a true cylindrical configuration to the rear bore having a diameter conforming generally to the diameter of the piston whereby to provide bearing support for a rear end of the piston.

15. The master cylinder assembly according to claim 13 wherein:
a reservoir port opens in the groove; and
the bearing has a crenellated configuration allowing the flow of hydraulic fluid from the reservoir port and through the bearing into the forward bore.

16. The master cylinder assembly according to claim 15 wherein:
the bearing includes an annular rearwardly extending lip portion;
the crenelated configuration is provided in the bearing lip portion;
the master cylinder assembly further includes an annular seal positioned in the annular groove forwardly of the reservoir port and rearwardly of the bearing; and
the seal includes an annular lip portion positioned in annular surrounding relation to the bearing lip portion and movable in response to fluid pressure variations between an outwardly flexed position in which it blocks communication between the reservoir port and the forward bore and an inwardly flexed position in which it allows communication between the reservoir port and the forward bore through the bearing lip portion crenelations.

17. A master cylinder assembly according to claim 16 wherein:
a plurality of circumferentially spaced, axially extending and radially inwardly opening grooves are provided in the forward bore; and
a plurality of circumferentially spaced, axially extending and radially inwardly opening grooves are provided in the cylindrical inner diameter of the bearing for coaction with the forward bore grooves, the bearing lip crenelations, and the seal lip to allow communication between the forward bore and the reservoir port even with the piston in a forwardly extended position received within the bearing member whereby fluid may readily flow from the reservoir port to a location in the forward bore forwardly of the piston as the piston moves from a forwardly extending position to a rearwardly retracted position.

18. A master cylinder assembly according to claim 17 wherein:
the annular seal comprises a primary seal; and
the master cylinder further includes a secondary annular seal positioned in the annular groove rearwardly of the reservoir port.

19. A master cylinder assembly according to claim 18 wherein:
the master cylinder further includes an annular spacer positioned in the annular groove between the primary seal and the secondary seal proximate the reservoir port; and
the spacer provides passage means allowing the passage of fluid therethrough from the reservoir port.

* * * * *